(12) United States Patent
Liu (10) Patent No.: US 8,745,830 B2
(45) Date of Patent: Jun. 10, 2014

(54) FIXING STRUCTURE

(75) Inventor: Chia-Hsin Liu, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 394 days.

(21) Appl. No.: 13/305,979

(22) Filed: Nov. 29, 2011

(65) Prior Publication Data

US 2012/0159750 A1 Jun. 28, 2012

(30) Foreign Application Priority Data

Dec. 23, 2010 (TW) .............................. 99145576 A (51) Int. Cl.
*F16B 21/02* (2006.01)
*E05C 5/02* (2006.01)
*E05C 19/02* (2006.01)
*E05C 5/00* (2006.01)

(52) U.S. Cl.
USPC .............................. 24/663; 292/140; 292/169

(58) Field of Classification Search
USPC ..................................... 24/663; 292/140, 169
See application file for complete search history.

(56) References Cited

U.S. PATENT DOCUMENTS

| | | | | |
|---|---|---|---|---|
| 3,798,935 A | * | 3/1974 | Blekking et al. | 292/62 |
| 4,423,895 A | * | 1/1984 | Mosley, Jr. | 292/36 |
| 5,275,029 A | * | 1/1994 | Myers | 292/60 |
| 2003/0145442 A1 | * | 8/2003 | Hoshino | 24/663 |
| 2007/0024065 A1 | * | 2/2007 | Hisatomi et al. | 292/304 |

* cited by examiner

Primary Examiner — Robert J Sandy
(74) Attorney, Agent, or Firm — Bacon & Thomas, PLLC (57) ABSTRACT

A fixing structure for locking an object having a hook piece is disclosed. The fixing structure includes a rotating element, an elastic element and a base. The rotating element includes a rotating element body, a plurality of bumps, a first containing space, and a second containing space. The first containing space and the second containing space are disposed inside the rotating element body. The second containing space communicates with the first space. The elastic element connects with a bottom of the rotating element. The rotating element and the elastic element are disposed in the base body. The trajectory groove is disposed around the inside of the base body. The rotating element body can rotatively rise or descend such that the hook piece can be in the first containing space or second containing space.

14 Claims, 11 Drawing Sheets

FIXING STRUCTURE

BACKGROUND OF THE INVENTION

1. Field of the Invention

The present invention relates to a fixing structure, specifically to a fixing structure such that the states of lock and detachment are determined by the way it is pressed.

2. Description of the Related Art

A fixing structure of the push-push type has been applied to many fields for locking an object to be locked in a fixing structure of the push-push type. The fixing structure of the push-push type may be applied as a plate outside a casing of a computer or a locking mechanism of a door of a cabinet. Pressing the fixing structure of the push-push type for the first time locks the object to be locked in the fixing structure of the push-push type. At this time, the spring of the fixing structure of the push-push type is compressed and generates an elastic force. Pressing the fixing structure of the push-push type a second time detaches the object to be locked from the fixing structure of the push-push type. Also, the elastic force can cause the object to be locked to eject from the fixing structure of the push-push type.

However, the reliability of a prior art fixing structure of the push-push type is poor and cannot bear a greater pulling force. When a greater pulling force is exerted on the prior art fixing structure of the push-push type, it may force the object to be locked to be detached from itself.

Therefore, it is desirable to provide a fixing structure of the push-push type to mitigate the problem of the poor reliability of the prior art fixing structure of the push-push type.

SUMMARY OF THE INVENTION

A main objective of the present invention is to provide a fixing structure to mitigate and/or obviate the aforementioned problems.

A fixing structure of the present invention is for locking an object to be locked having a hook piece. The fixing structure comprises a rotating element, an elastic element, and a base.

The rotating element comprises a rotating element body, a plurality of bumps, a first containing space, and a second containing space. The plurality of bumps are disposed on the outside of the rotating element body. The first containing space is disposed inside the rotating element body. When the hook piece is positioned in the first containing space, the object to be locked is not locked in the fixing structure. The second containing space is positioned in the rotating element body and communicates with the first containing space. When two ends of the hook piece turn to be positioned in the second containing space, the object to be locked is locked in the fixing structure. The elastic element connects with a bottom of the rotating element. The elastic element is for generating an elastic force when being compressed to push the rotating element body.

The base comprises a base body and a trajectory groove. The rotating element and the elastic element are disposed in the base body. The trajectory groove is disposed around the inside of the base body. Each bump is able to move in the trajectory groove. When the bump moves in the trajectory groove, the rotating element body is able to rotatively rise or descend in the base body. Each bump is correspondingly positioned in a respective position in the trajectory groove.

With the above structure, when an external force is added to the hook piece of the object to be locked, the hook piece enters the first containing space and causes the rotating element body to rotate and descend, and causes each of the plurality of bumps to move in the trajectory groove. When the external force is removed, the elastic force generated when the elastic element is compressed causes the rotating element body to rotate and rise such that the hook piece enters the second containing space, and the hook piece of the object to be locked is locked in the fixing structure at this time.

In one embodiment of the present invention, the trajectory groove comprises a first path and a second path. The first path comprises a plurality of first projections. Each first projection is for limiting the position of the plurality of bumps. The second path comprises a plurality of second dents. Each of the plurality of second dents is for limiting the position of the plurality of bumps. The first path and second path are misaligned such that each bump is able to continuously move clockwise or counterclockwise in the trajectory groove.

BRIEF DESCRIPTION OF THE DRAWINGS

FIGS. 6A to 13 are schematic drawings of an embodiment of the object to be locked being fixed in or detached from the fixing structure of the present invention.

DETAILED DESCRIPTION OF THE PREFERRED EMBODIMENT

The advantages and innovative features of the invention will become more apparent from the following detailed description when taken in conjunction with the accompanying drawings.

A fixing structure of the present invention may be disposed in all kinds of electronic devices and objects to be locked, such as a kinetic plate outside a casing of a computer that can be opened and closed, and a locking mechanism of an upper lid and a lower lid of an electronic device of a cover-lifting type (such as a notebook computer or a translator). The applied field of the present invention, however, is not limited to electronic devices. The fixing structure of the present invention may be applied to any object to be locked and a device that needs to be locked or detached.

Figure 1:
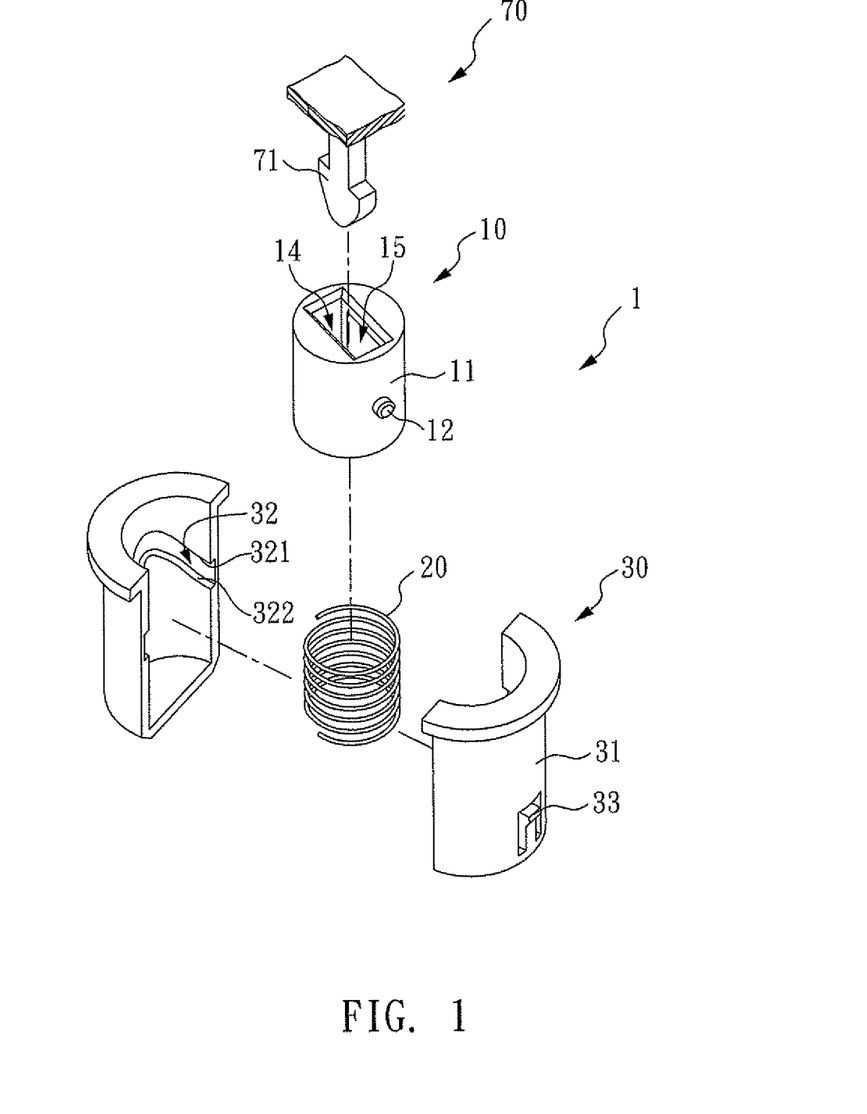
FIG. 1 is an exploded perspective view of an embodiment of a fixing structure of the present invention.

Please refer to FIGS. 1 to 13, which illustrate one embodiment of the fixing structure of the present invention, for the following paragraphs. As shown in FIG. 1, the fixing structure 1 of the present invention is for locking an object to be locked 70 having a hook piece 71. The fixing structure 1 comprises a rotating element 10, an elastic element 20, and a base 30.

Figure 2:
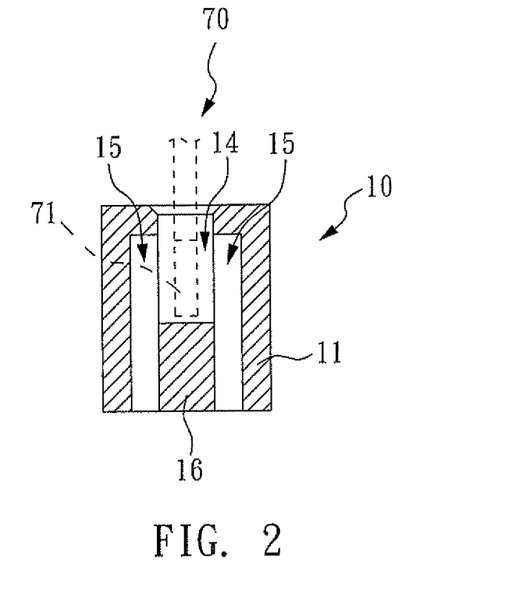
FIG. 2 is a cross-sectional drawing of an embodiment of a hook piece in a first containing space of the present invention.

The rotating element 10 comprises a rotating element body 11, a plurality of bumps 12, a first containing space 14, and a second containing space 15. In one embodiment of the present invention, the number of the bumps 12 is two. Each bump 12 is correspondingly disposed on the outside of the rotating element body 11. Please refer to FIGS. 1 and 2. The first containing space 14 is disposed inside the rotating element body 11. In one embodiment of the present invention, the opening of the first containing space 14 is rectangular. The second containing space 15 is positioned in the rotating element body 11 and communicates with the first containing space 14. As shown in FIG. 2, in this embodiment, the rotating element 10 further comprises a support 16. The support 16 is positioned in the rotating element body 11. The support 16 is for supporting the hook piece 71. When the object to be locked 70 is locked in the fixing structure 1, the support 16 is positioned between the hook piece 71 and the elastic element 20.

Figure 3:
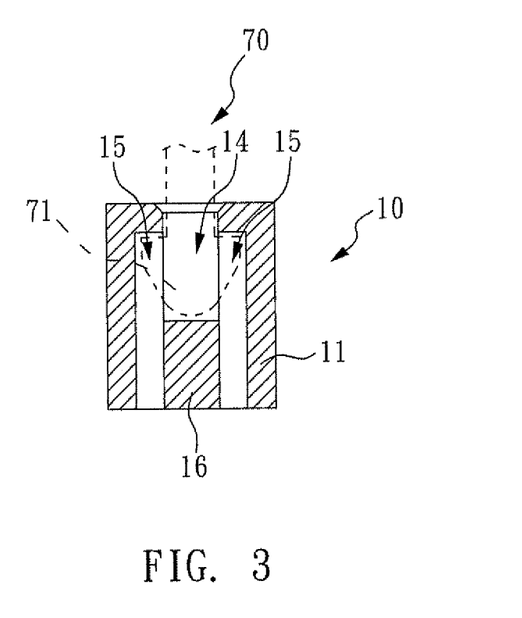
FIG. 3 is a cross-sectional drawing of an embodiment of the hook piece in a second containing space of the present invention.

As shown in FIGS. 1 and 2, in one embodiment of the present invention, the appearance of the hook piece 71 of the object to be locked 70 corresponds to the opening of the first containing space 14, and the hook piece 71 is slightly smaller than the opening of the first containing space 14, such that the hook piece 71 is able to pass the opening and to be put in the first containing space 14. When the hook piece 71 is positioned in the first containing space 14, the object to be locked 70 is not locked in the fixing structure 1. As shown in FIG. 3, when the rotating element 10 rotates through a certain angle, two ends of the hook piece 71 are positioned in the second containing space 15. At this time, the hook piece 71 is misaligned with the opening of the first containing space 14 and thus not able to detach from the second containing space 15. Thus the object to be locked 70 is locked in the fixing structure 1.

The elastic element 20 connects with the bottom of the rotating element 10. When the elastic element 20 is compressed, the elastic element 20 is for generating an elastic force to push the rotating element 10. In one embodiment of the present invention, the elastic element 20 is a helical spring. However, the elastic element 20 is not limited to the above objects. An elastic element (such as a spring piece) that provides stress on the rotating element 10 can be the elastic element.

As shown in FIG. 1, the base 30 comprises a base body 31 and a trajectory groove 32. The rotating element 10 and the elastic element 20 are disposed in the base body 31. The rotating element 10 is able to rotate relative to the base 30. In one embodiment of the present invention, the base 30 may be formed by a single body or by a combination of two pieces. However, the present invention is not limited by the forms of the design mentioned above.

The trajectory groove 32 of the present invention is disposed around the inside of the base body 31. Each bump 12 is movably positioned in the trajectory groove 32. In one embodiment of the present invention, the trajectory groove 32 is continuously wavy. However, the shape of the trajectory groove 32 is not limited to the above shape. For example, the trajectory groove may be in a zig-zag shape as well.

Figure 4:
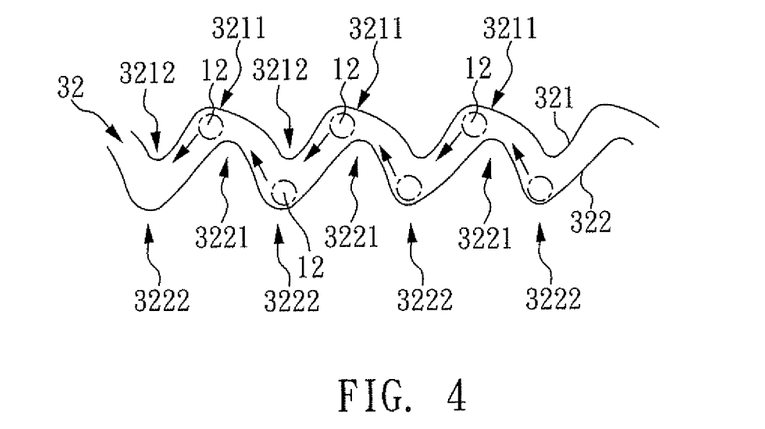
FIG. 4 is an expanded schematic view of an embodiment of a trajectory groove of the present invention.

The trajectory groove 32 of the present invention comprises a first path 321 and a second path 322. The trajectory groove 32 is a track for the bump 12 to slide as defined by the first path 321 and the second path 322. As shown in FIG. 4, which is an expanded schematic view of the trajectory groove 32 of the present invention, the first path 321 of the present invention comprises a plurality of first projections 3211 and a plurality of first dents 3212. The second path 322 of the present invention comprises a plurality of projections 3221 and a plurality of second dents 3222. Each first projection 3211, each first dent 3212, each projection 3221, and each second dent 3222 are used for limiting the position of each bump 12. The plurality of first dents 3212 and the plurality of first projections 3211 are arranged alternately. The plurality of projections 3221 and the plurality of second dents 3222 are arranged alternately. In one embodiment of the present invention, the number of the first projections, the number of the first dents, the number of the projections, and the number of the second dents are four. However, the present invention is not limited to that number. For example, the number of the first projections, the number of the first dents, the number of the projections, and the number of the second dents may be three. As shown in FIG. 4, the first path 321 and the second path 322 are slightly misaligned. Each bump 12 is able to move in a certain direction in the trajectory groove 32 with the misalignment. It should be noted that when the rotating element body 11 is being operated, each bump 12 simultaneously moves along the trajectory groove 32 to the plurality of second dents 3222 or the plurality of first projections 3211. When a downward pressing force is exerted on the rotating element body 11, each bump 12 moves from each first projection 3211 to each second dent 3222 along the trajectory groove 32. It should be noted that each first projection 3211 and each corresponding projection 3221 are slightly arranged alternately. In the embodiment shown in FIG. 4, each of the plurality of first projections 3211 is on the left side of each of the plurality of projections 3221. Each of the plurality of first dents 3212 is on the right side of each of the plurality of second dents 3222. Therefore, when each bump 12 moves from each first projection 3211 along the trajectory groove 32, it can move only toward the left side of FIG. 4 (i.e., clockwise).

Further, the bump 12 drives the rotating element body 11 to rotate clockwise, and the rotating element body 11 descends and compresses the elastic element 20. The elastic element 20 generates an elastic force because it is compressed. When the downward pressing force on the rotating element body 11 no longer exists, the elastic force of the elastic element 20 provides the rotating element body 11 a force to rotate upward. It should be noted that each first dent 3212 and each corresponding second dent 3222 are slightly arranged alternately. Thus when each bump 12 moves from each second dent 3222 along the trajectory groove 32, it can move only left (i.e., clockwise), whereby the rotating element body 11 is able to rotatively rise or descend in the base body 31. Each bump 12 is correspondingly positioned in a respective position in the trajectory groove 32.

Figure 5:
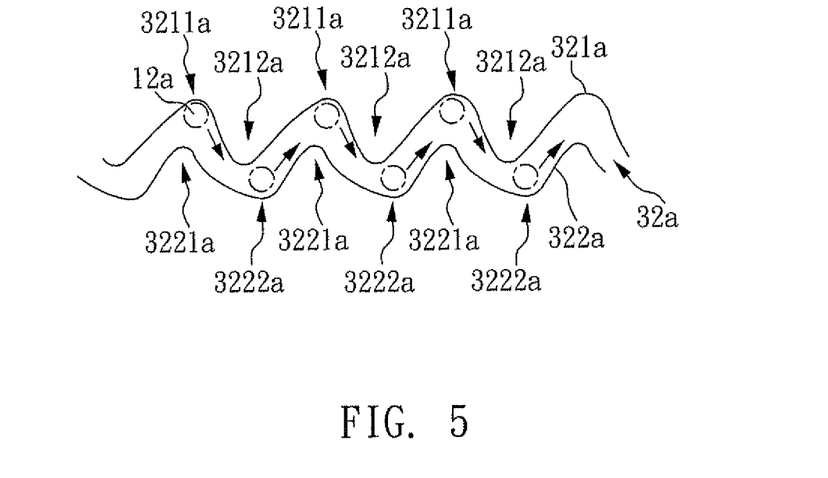
FIG. 5 is an expanded schematic view of another embodiment of the trajectory groove of the present invention.

In another embodiment of the present invention, as shown in FIG. 5, a first path 321a and a second path 322a of a trajectory groove 32a are arranged in another form of asymmetrical alignment. With the asymmetrical alignment, each bump 12a is able to move always counterclockwise in the trajectory groove 32a.

As shown in FIG. 1, in order to facilitate the locking mechanism, two locking hooks 33 of the present invention are disposed on the outside of the base body 31. The locking hooks 33 are for enabling the base 30 to be locked in an electronic device that a user desires to lock the base 30 in. However, the use of the present invention is not limited to an electronic device.

The following paragraphs illustrate an embodiment of the states of lock and detachment between the fixing structure 1 of the present invention and the object to be locked 70 having a hook piece 71 according to the steps of the operation of the actual use of the fixing structure 1, step by step. In this embodiment, the object to be locked 70 is an upper lid of an electronic device. The fixing structure 1 is positioned at a lower lid of the electronic device, and the fixing structure 1 is positioned in a corresponding position of the hook piece 71 of the object to be locked 70.

(1) Start State

Figure 6A:
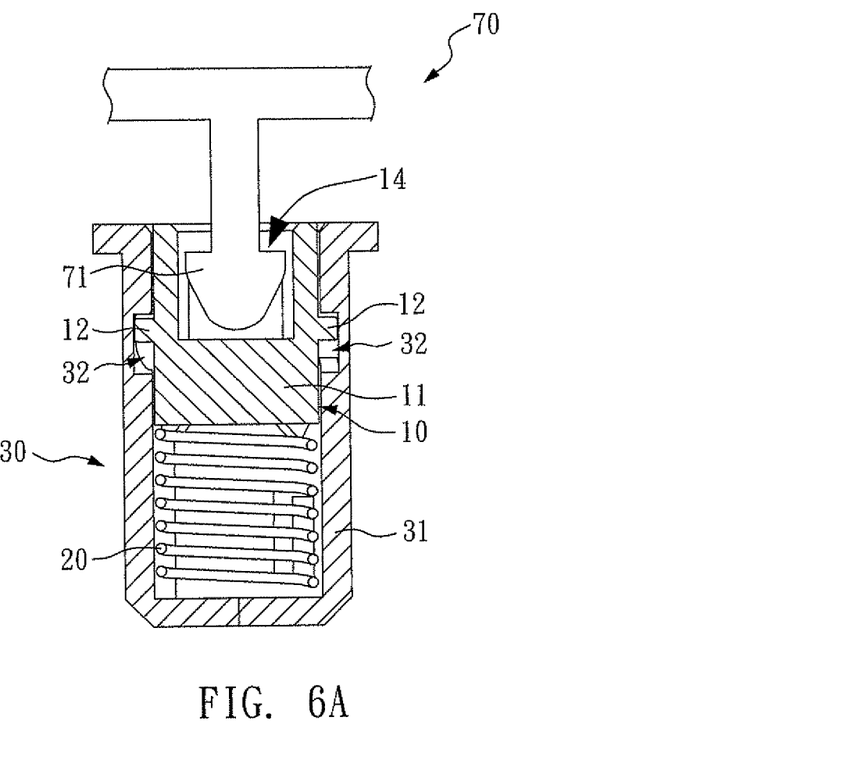
Figure 6B:
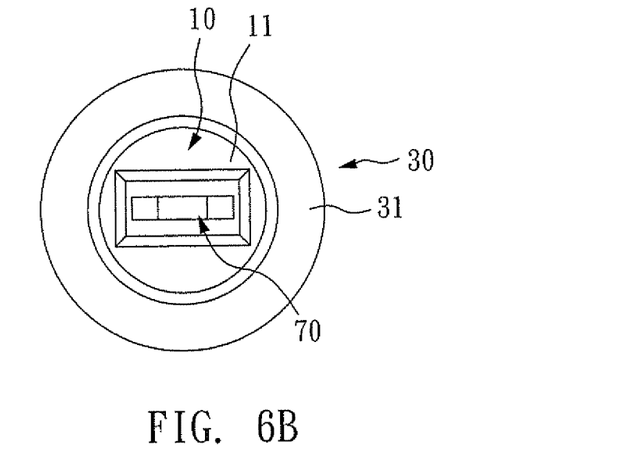
Figure 7:
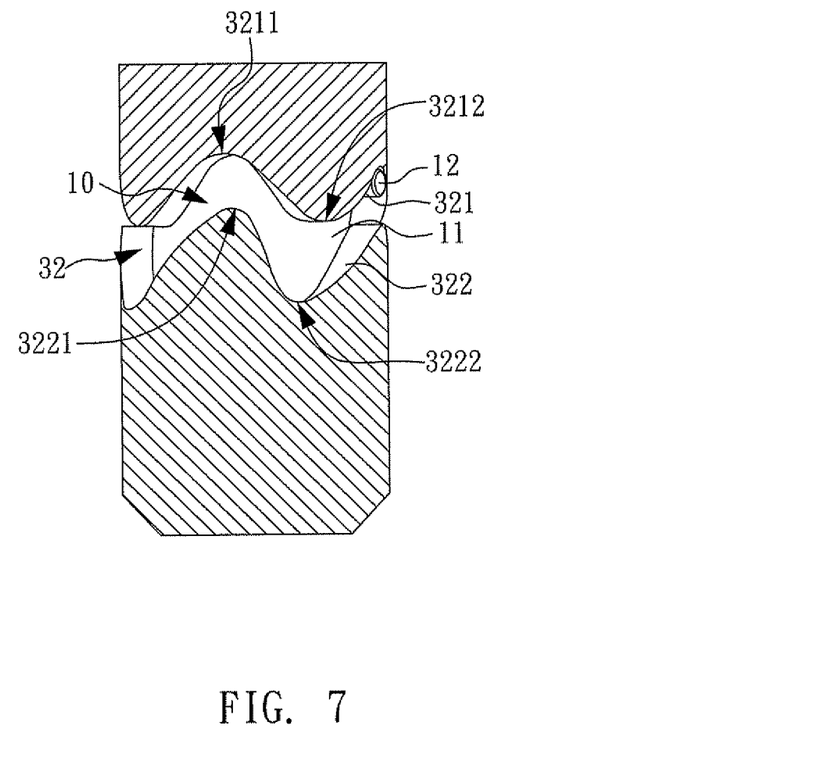

Please refer to FIG. 4, FIG. 6A, FIG. 6B, and FIG. 7. FIG. 6B is a top view of one embodiment of a start state of the object to be locked and the fixing structure. When the user wants to lock the object to be locked 70 in the fixing structure 1, he or she puts the hook piece 71 in the first containing space 14. At this time, the rotating element body 11 is under the support of the elastic element 20. The bump 12 is positioned at the first projection 3211 (the right-most bump 12 in FIG. 4).

(2) First Pressing Downward State

Figure 8A:
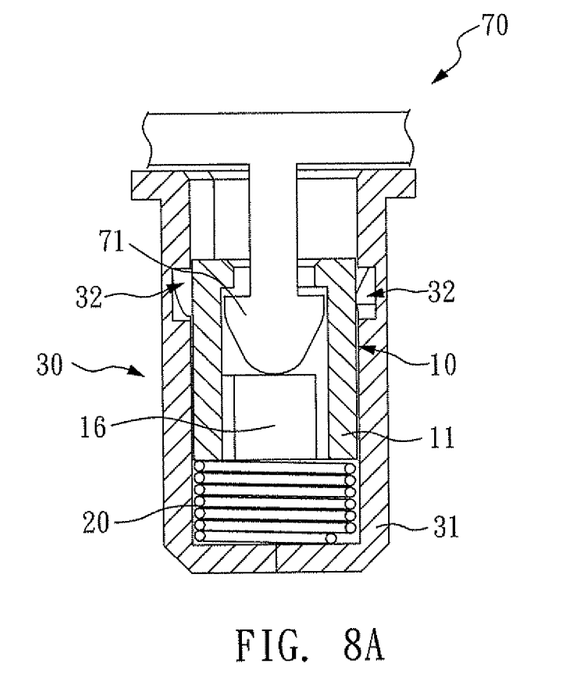
Figure 8B:
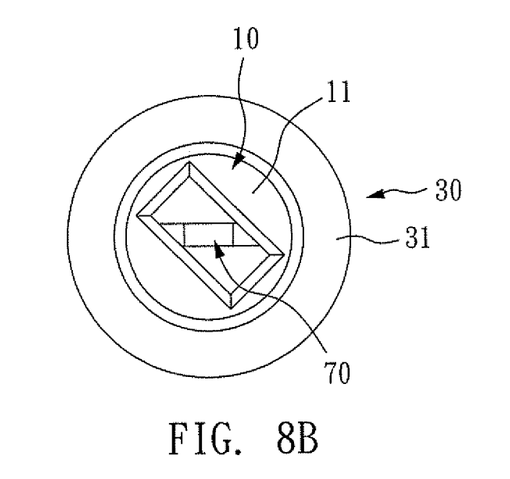
Figure 9:
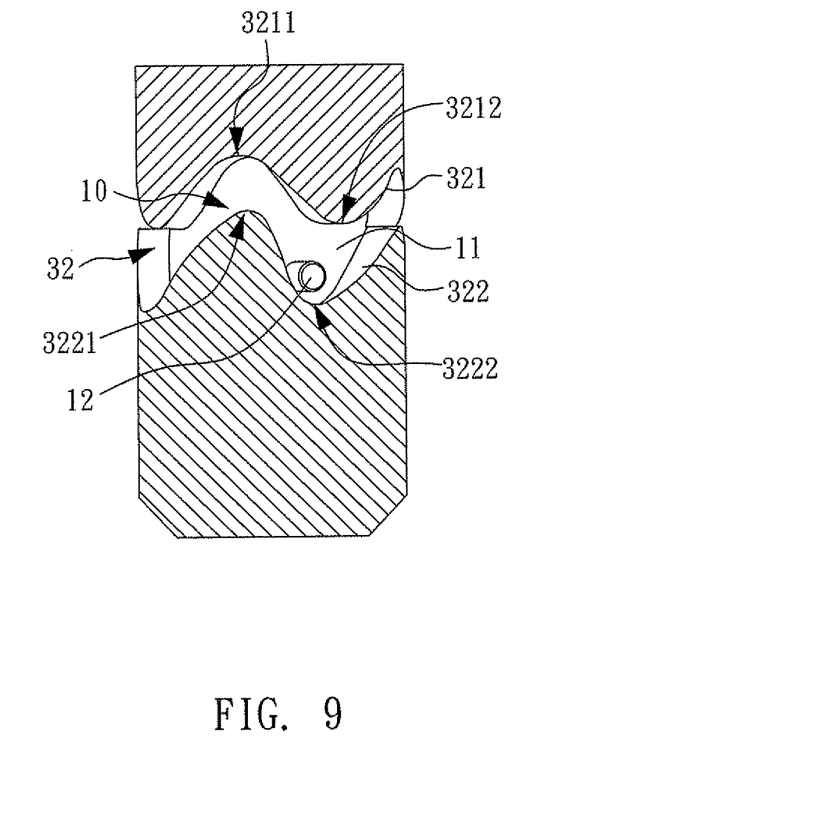
Figure 10:
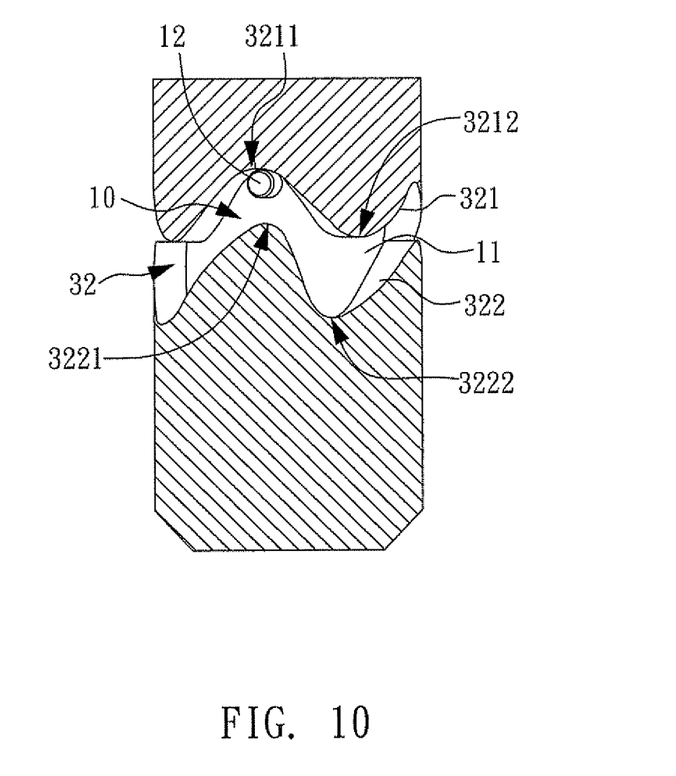

Please refer to FIG. 4, FIG. 8A, FIG. 8B, and FIG. 9. FIG. 8B is a top view of one embodiment of a first pressing downward state of the object to be locked and the fixing structure. When the user continues pressing downward on the object to be locked 70, the hook piece 71 presses downward on the support 16 and causes the bump 12 to move clockwise from the first projection 3211 to the second dent 3222 along the trajectory groove 32. At this time, the rotating element body 11 rotates clockwise and descends and compresses the elastic element 20. The elastic element 20 generates an elastic force because it is compressed.

(3) First Restoring State

Figure 11A:
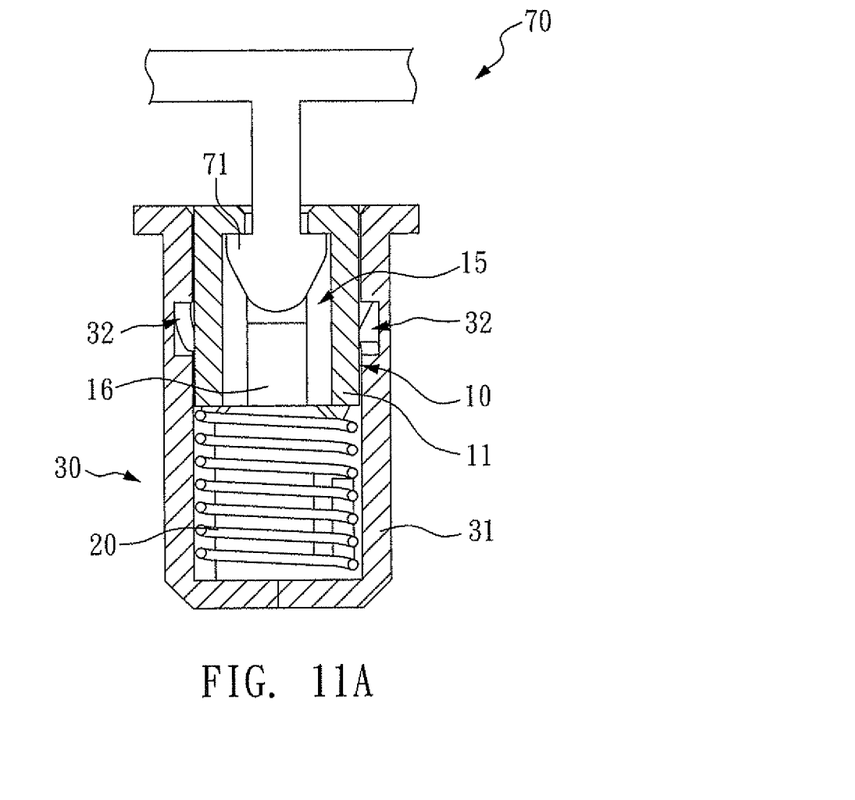
Figure 11B:
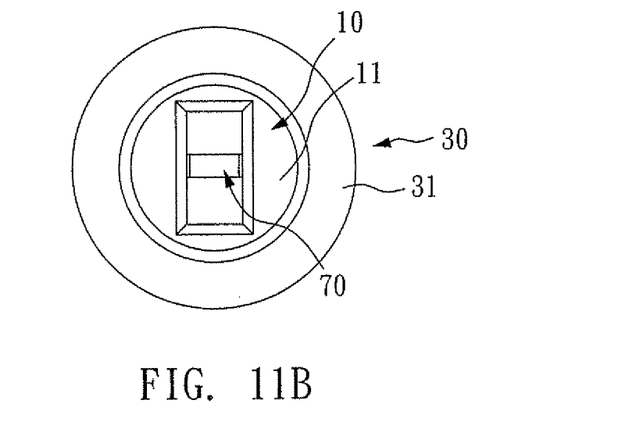

Next, please refer to FIG. 3, FIG. 4, FIG. 10, FIG. 11A, and FIG. 11B. FIG. 11B is a top view of one embodiment of a first restoring state of the object to be locked and the fixing structure. As shown in FIG. 11A and FIG. 11B, when the user releases his/her hand in the previous state, the stress on the rotating element body 11 is removed. The elastic force generated by the elastic element 20 when being compressed causes the rotating element body 11 to rotate upward. Each bump 12 moves clockwise along the trajectory groove 32 from each second dent 3222 to an adjacent first projection 3211. Also, the rotating element body 11 rotates through a certain angle such that the two ends of the hook piece 71 enter the second containing space 15 (as shown in FIG. 3). The hook piece 71 is misaligned with the opening of the first containing space 14 and cannot be detached from the second containing space 15. Thus the object to be locked 70 is locked in the fixing structure 1. In one embodiment of the present invention, the number of the first projections, the number of the first dents, the number of the projections, and the number of the second dents are four. Thus the certain angle through which the rotating element body 11 rotates is substantially 90 degrees. It should be noted that the certain angle depends on the number of the first projections, the first dents, the projections, and the second dents.

(4) Second Pressing Downward State

Figure 12A:
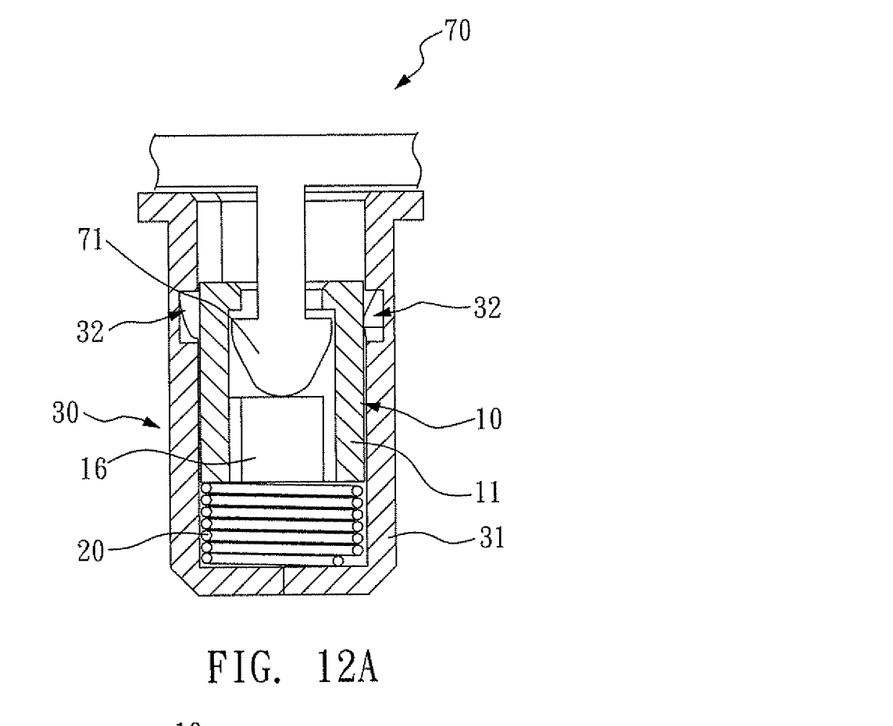
Figure 12B:
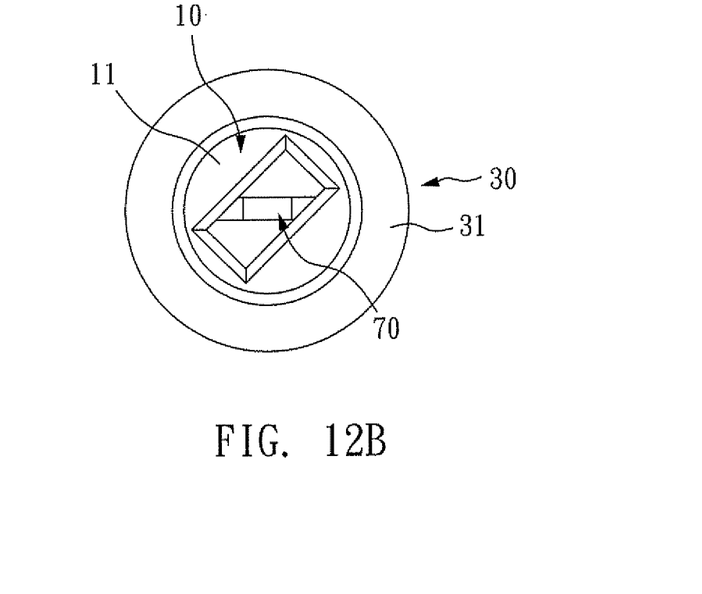
Figure 13:
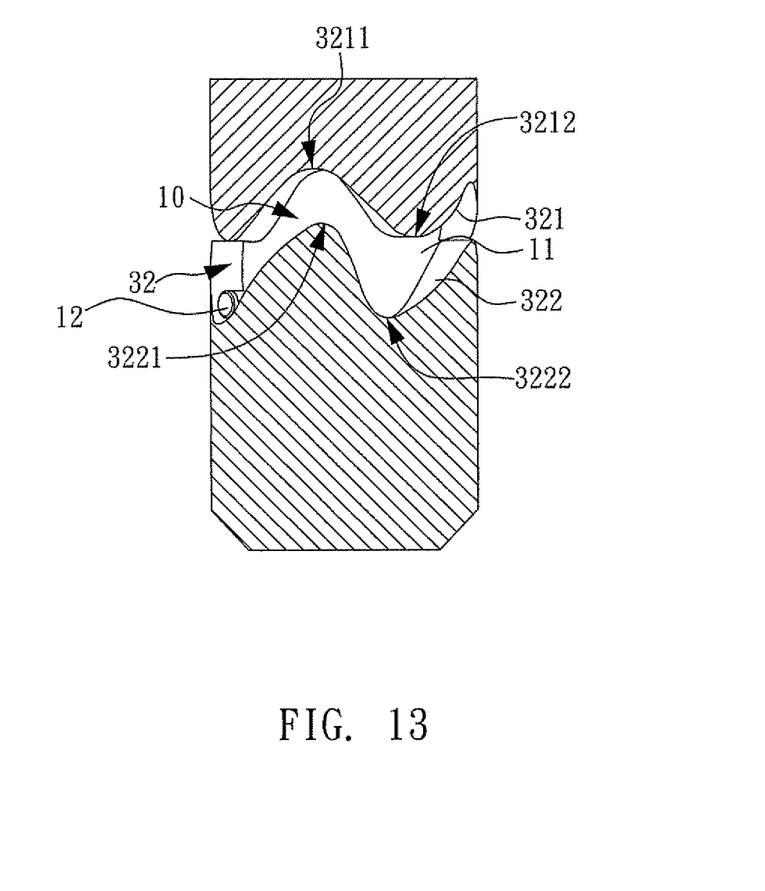

Next, please refer to FIG. 4, FIG. 12A, FIG. 12B, and FIG. 13. FIG. 12B is a top view of one embodiment of a second pressing downward state of the object to be locked and the fixing structure. When the user wants to detach the object to be locked 70 from the fixing structure 1, the user presses the object to be locked 70 again. The hook piece 71 presses the support 16 downward and causes each bump 12 to move clockwise along the trajectory groove 32 from the first projection 3211 to the second dent 3222. At this time, the rotating element body 11 rotates clockwise and descends and compresses the elastic element 20. The elastic element 20 generates an elastic force because it is compressed.

(5) Second Restoring State

When the user release his/her hand in the previous state, the stress on the rotating element body 11 is removed. The elastic force generated by the elastic element 20 when being compressed causes the rotating element body 11 to rotate upward. Each bump 12 moves clockwise along the trajectory groove 32 from each second dent 3222 to two of the adjacent first projections 3211. At this time, the rotating element body 11 rotates through a certain angle again such that two ends of the hook piece 71 turn and enter the first containing space 14 (as in the aforementioned start state). The object to be locked 70 is then able to be detached from the fixing structure 1.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A fixing structure, for locking an object to be locked having a hook piece, the fixing structure comprising:
   a rotating element, comprising:
      a rotating element body;
      a plurality of bumps, being disposed on the outside of the rotating element body;
      a first containing space, being disposed inside the rotating element body, wherein when the hook piece is positioned in the first containing space, the object to be locked is not locked in the fixing structure;
      a second containing space, being positioned in the rotating element body and communicating with the first containing space, wherein when the hook piece is positioned in the second containing space, the object to be locked is locked in the fixing structure;
   an elastic element, connecting with a bottom of the rotating element, wherein the elastic element is for generating an elastic force when being compressed to push the rotating element body; and
   a base, comprising:
      a base body, wherein the rotating element and the elastic element are disposed in the base body; and
      a trajectory groove, being disposed around the inside of the base body, each of the plurality of bumps being able to move in the trajectory groove, wherein when the bump moves in the trajectory groove, the rotating element body is able to rotatively rise or descend in the base body, and each of the plurality of bumps is correspondingly positioned in a respective position in the trajectory groove;
   whereby when an external force is added to the hook piece of the object to be locked, the hook piece enters the first containing space and causes the rotating element body to rotate and descend, and causes each of the plurality of bumps to move in the trajectory groove; when the external force is removed, the elastic force generated when the elastic element is compressed causes the rotating element body to rotate and rise such that the hook piece enters the second containing space, and the hook piece of the object to be locked is locked in the fixing structure at this time.

2. The fixing structure as claimed in claim 1, wherein the trajectory groove comprises:
   a first path, comprising a plurality of first projections, wherein each of the plurality of first projections is for limiting the position of the plurality of bumps; and
   a second path, comprising a plurality of second dents, wherein each of the plurality of second dents is for limiting the position of the plurality of bumps, wherein the first path and the second path are misaligned such that each of the plurality of bumps is able to continuously move clockwise or counterclockwise in the trajectory groove;
   whereby when an external force is added to the hook piece of the object to be locked, the hook piece enters the first containing space and causes the plurality of bumps to move along the trajectory groove to the plurality of second dents, and the rotating element body rotates and descends; when the external force is removed, the elastic force generated when the elastic element is compressed causes the rotating element body to rotate and rise such that the plurality of bumps move along the trajectory groove to the plurality of first projections, and the rotating element body rotates through a certain angle, rotation of the rotating element body causing the hook piece to move into the second containing space such that the object to be locked is locked in the fixing structure.

3. The fixing structure as claimed in claim 2, wherein the first path further comprises a plurality of first dents, wherein each of the plurality of first dents is for limiting the position of each of the plurality of bumps, and the plurality of first dents and the plurality of first projections are arranged alternately, and the second path further comprises a plurality of projections, wherein each of the plurality of projections is for limiting the position of each of the plurality of bumps, and the plurality of projections and the plurality of second dents are arranged alternately.

4. The fixing structure as claimed in claim 3, wherein each of the plurality of first projections is on the left side of each of the plurality of projections, and each of the plurality of first dents is on the right side of each of the plurality of second dents.

5. The fixing structure as claimed in claim 4, wherein the number of the plurality of first projections is four, the number of the plurality of first dents is four, the number of the plurality of projections is four, and the number of the plurality of second dents is four.

6. The fixing structure as claimed in claim 2, wherein the certain angle is substantially 90 degrees.

7. The fixing structure as claimed in claim 6, wherein the trajectory groove is continuously wavy.

8. The fixing structure as claimed in claim 1, wherein the trajectory groove is continuously wavy.

9. The fixing structure as claimed in claim 1, wherein the rotating element further comprises a support, the support is positioned in the rotating element body, and the support is for supporting the hook piece.

10. The fixing structure as claimed in claim 1, wherein the number of the plurality of the bumps is two.

11. The fixing structure as claimed in claim 1, wherein the elastic element is a helical spring.

12. The fixing structure as claimed in claim 1, wherein the trajectory groove comprises:
 a first path, comprising a plurality of first projections and a plurality of first dents, the plurality of first dents and the plurality of first projections being arranged alternately; and
 a second path, comprising a plurality of second dents and a plurality of projections, the plurality of projections and the plurality of second dents being arranged alternately;
 wherein each of the plurality of first projections is on the left side of each of the plurality of projections, and each of the plurality of first dents is on the right side of each of the plurality of second dents.

13. The fixing structure as claimed in claim 12, wherein the trajectory groove is continuously wavy.

14. The fixing structure as claimed in claim 13, wherein the number of the plurality of first projections is four, the number of the plurality of first dents is four, the number of the plurality of projections is four, and the number of the plurality of second dents is four.

* * * * *